June 28, 1927.
L. F. LAMPLOUGH
1,633,591
METHOD OF AND APPARATUS FOR VULCANIZING MATERIAL
Filed Oct. 25, 1923 2 Sheets-Sheet 2
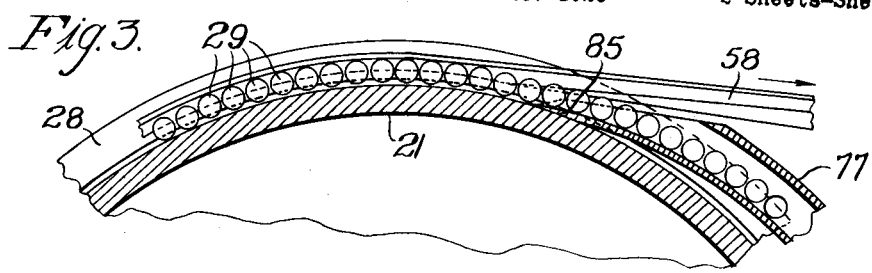
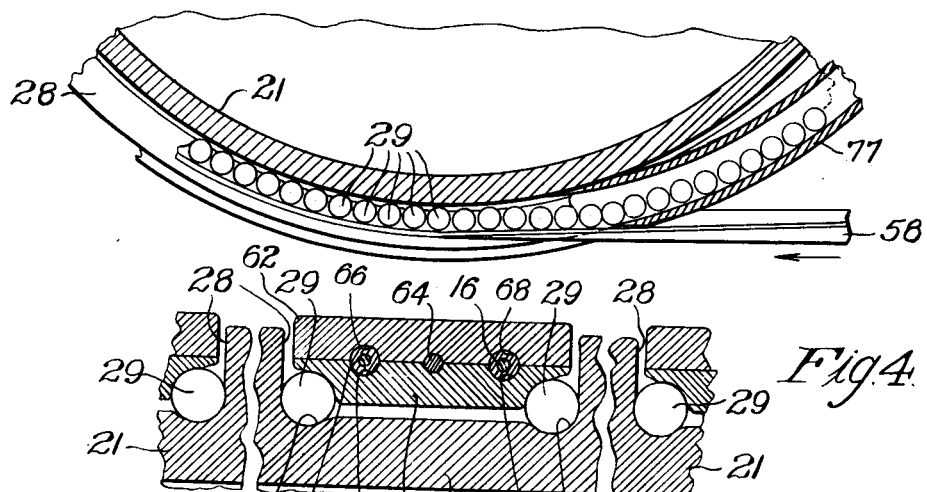
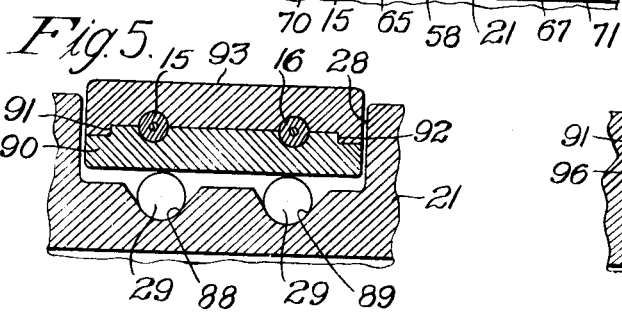
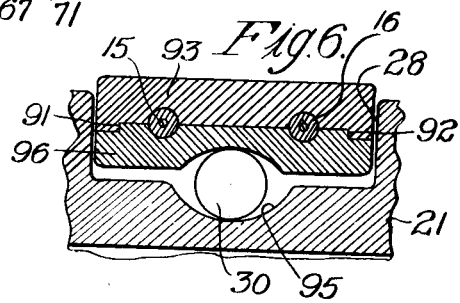
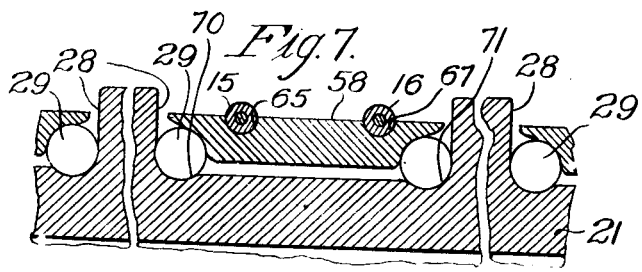
Inventor
L. F. Lamplough
by H. A. Pattison
Atty.

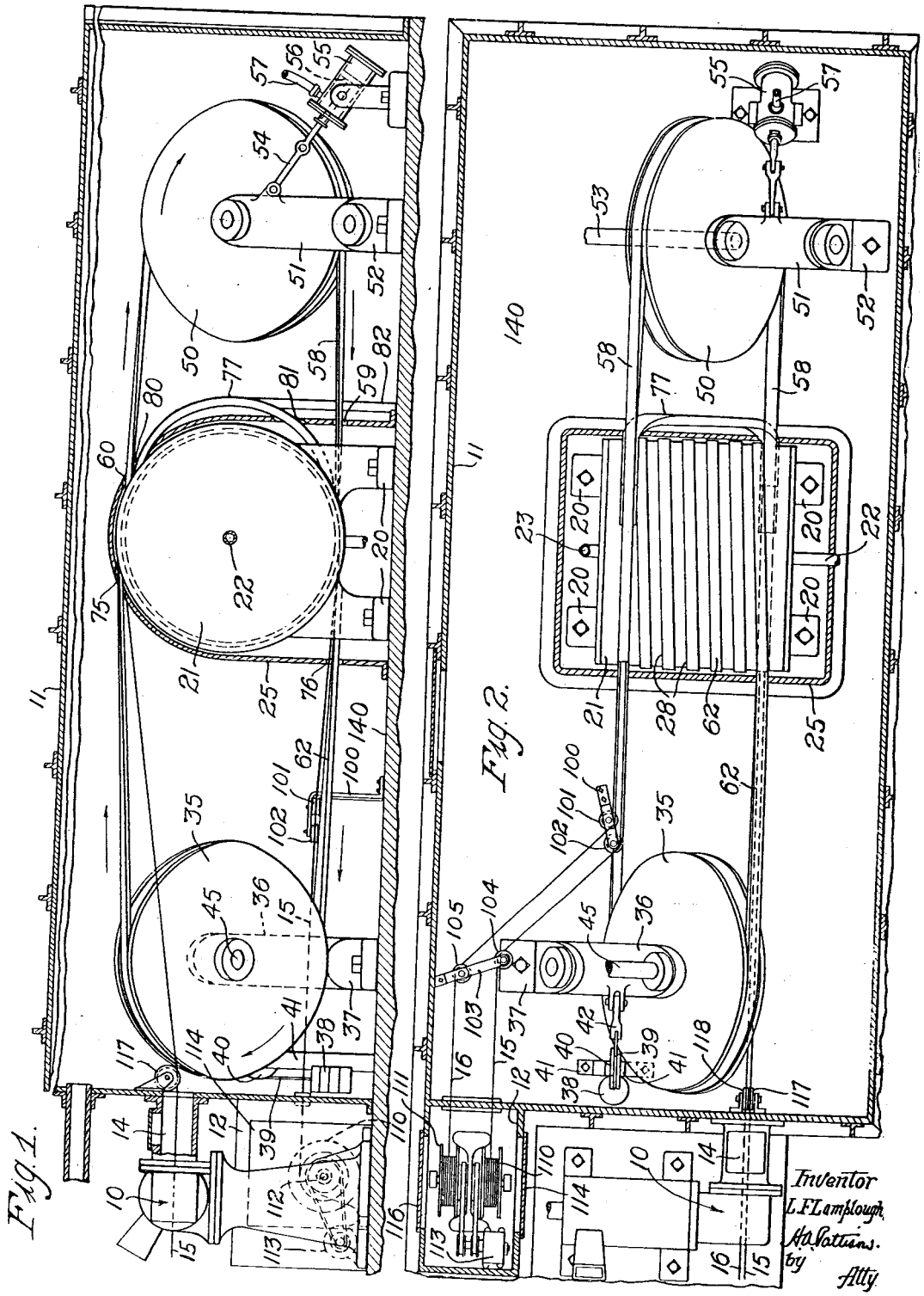

Patented June 28, 1927.

1,633,591

UNITED STATES PATENT OFFICE.

LESLIE FAWCETT LAMPLOUGH OF CHICAGO, ILLINOIS, ASSIGNOR TO WESTERN ELECTRIC COMPANY, INCORPORATED, OF NEW YORK, N. Y., A CORPORATION OF NEW YORK.

METHOD OF AND APPARATUS FOR VULCANIZING MATERIAL.

Application filed October 25, 1923. Serial No. 670,692.

This invention relates to methods of and apparatus for vulcanizing material, and more particularly to a method of and apparatus for vulcanizing a continuously moving length of material.

In the manufacture of wire or cable covered with vulcanized material, such as a rubber compound, it is desirable to make the process continuous from the application of the vulcanizable material to the completion of the vulcanization. This continuity of process obviates the necessity of handling the material between succeeding steps in the manufacture, thus cheapening and expediting the manufacture, as well as eliminates the possibility of irregularities in and injury to the material which might be introduced due to intermediate handling thereof, such as winding upon a reel. Such a process is particularly advantageous in the manufacture of rubber covered wires or cables if they are used as electrical conductors and wherein the vulcanized material constitutes an insulating sheath for the core. In instances of this nature, deformation of the material which might be occasioned by handling the sheathed core before the sheathing is properly vulcanized may in some cases decrease the thickness of such sheath at some points along the core, thus materially lessening the insulation resistance of the sheath at such points.

It is an object of the invention to enclose a strand of vulcanizable material in a moving continuous pressure sheath during vulcanization.

Another object is to provide a pair of endless belts cooperating to form a mold for enclosing a continuously moving strand of vulcanizable material during vulcanization.

A further object is to provide an anti-friction track associated with a heated vulcanizing drum for guiding a traveling conveyor carrying a strand of vulcanizable material over the periphery of the drum.

An additional object is to provide an internally heated vulcanizing drum having a track formed in the periphery thereof, along which a plurality of rollable elements are fed to provide an anti-friction means for a flexible continuous metal mold enclosing a strand of vulcanizable material.

An apparatus embodying the invention and by which the process may be practiced may comprise a heated drum, in the outer wall of which a spiral track is formed for guiding over the periphery of the drum a pair of flexible metal endless belts. Polished steel friction reducing balls are fed in a continuous train into one end of the track and are discharged from the other end of the track into means for returning them to the first-mentioned end of the track. One face of each belt is provided with a plurality of grooves which cooperate when the belts are brought into face to face engagement to completely and individually enclose a plurality of wires or cables covered with vulcanizable rubber compound. The engaged belts serve to convey in a continuous sequence successively adjacent sections of the wires or cables over the periphery of the drum, thereby vulcanizing the rubber compound constituting the covering or sheath. Adjustable tension means provided for the belts cause them to exert a predetermined uniform unit pressure upon the strands throughout their vulcanization.

Other features of the invention will clearly appear from the following description and the accompanying drawings illustrating one embodiment of the apparatus which may be used in practicing the invention.

In the drawings,

Fig. 1 is a side elevation, partly in section, of the mechanism employed directly associated with an extruding machine and a take-up apparatus;

Fig. 2 is a plan view, also partially in section, of the apparatus shown in Fig. 1;

Fig. 3 is an enlarged fragmentary sectional view showing particularly the manner in which the ball bearings are discharged upon the drum at one end of the track and fed into the opposite end of the track;

Fig. 4 is an enlarged fragmentary side view, in section, of the drum showing the track formed in the periphery thereof and together with the conveyor and the ball bearings thereof;

Figs. 5 and 6 are modifications of the arrangement shown in Fig. 4, and

Fig. 7 is a similar view showing the use of one belt only.

Referring to the drawings in detail, in which like reference numerals designate similar parts throughout the various views, 10 represents an extruding machine of any suitable type, such as is used to simultaneously extrude rubber compound around a plurality of wires or cables, 11 is an airtight enclosure surrounding the vulcanizing apparatus, and 12 is an enclosure for the take-up apparatus for receiving the vulcanized strand material. Associated with the extruding machine and directly connecting the machine with the enclosure 11, is an airtight chamber 14 containing powdered talc or soapstone, through which a plurality of covered wires or cables 15 and 16 pass on their way into the chamber 11. Within the enclosure 11 and supported from a base 140 by a plurality of suitable brackets 20 is a stationary hollow drum 21. A conduit 22 extending into one end of the drum 21 may be connected with any suitable steam supply for furnishing steam to the interior of the drum to create vulcanizing temperatures. A conduit 23 extending from the lower portion of the opposite end of the drum serves to withdraw from the interior of the drum any condensed moisture which may be present. A heat retaining metal casing 25 is attached to the base and completely encloses the drum 21.

A rectangular groove 28 formed on the exterior surface of the drum 21 forms a spiral track or way extending from one end of the drum substantially to the other end thereof. The bottom of this track may be formed as shown in Figs. 4, 5, 6, or 7 to provide races for anti-friction balls 29 or 30.

Near the left-hand end of the enclosure 11 a grooved pulley 35 is rotatably secured to the free end of an extension arm 36, the other end of which arm is pivotally secured to an angular bracket 37. A counter-weight 38 attached to the end of a cable 39 passing over an idler pulley 40 suitably mounted upon the floor by means of a pair of brackets 41, the other end of the cable 39 being attached by a link 42 to the extension arm 36, serves to maintain the arm 36 and the pulley 35 carried thereby in any desired position, depending upon the mass of the counter-weight 38. A shaft 45 secured to the pulley 35 and rotatably supported in a bearing in the arm 36 may be attached in any well-known manner, as by bevel gears or a universal joint, to a suitable source of power (not shown) for causing the rotation of the pulley 35. Near the right-hand end of enclosure 11 is a similar pulley 50 rotatably mounted in a bearing carried upon the free end of an extension arm 51, the other end of such arm being pivotally attached to an angular bracket 52. A shaft 53 also supported by the arm 51 also may be connected to any suitable source of power (not shown) for driving the pulley 50 in the same manner as and in synchronism with the pulley 35. However, it may not be necessary in all cases to drive both of the pulleys, it being only essential to drive the lower belt. A pneumatic cylinder 55 having a piston 56 therein and operated by the transmission of compressed air into the cylinder 55 through a pipe or hose 57 is connected with the extension arm 51 by means of a link 54. By regulating the pressure of the air which is admitted to a cylinder 55, the pulley 50 and the supporting arm 51 may be maintained in any desired angular relation with the base and in the same manner as the counterweight arrangement associated with the pulley 35 and the arm 36. However, it is to be understood that either the pneumatic piston or counterweight arrangement may be used for each of the pulleys if desired.

It will be noted that the brackets 37 and 52 are so designed as to assure that in each case the top and bottom of the associated pulleys 35 and 50 respectively are substantially in line with the opposite ends of the drum 21. Referring particularly to Figs. 1, 2, and 4, an endless metal belt 58 being formed as shown in Fig. 4, traverses around the pulley 50 as said pulley is rotated, comes in contact with the drum 21 at the lowermost point thereof, is carried around the left-hand half of the drum and at a point near the top thereof enters the track 28. Due to the rotation of the pulley 50, the belt 58 is drawn in a spiral path through the track 28 and emerges therefrom at a point substantially at the top of the drum and at the opposite end thereof. From thence it returns to the top of the pulley 50. Openings 59 and 60 are provided in the wall of the casing 25 for the ingress and egress of the belt 58. In a somewhat similar manner a belt 62 passing around and driven by the pulley 35 engages the drum 21 at the top and one end thereof at the same point that the belt 58 enters the track 28. The belt 62 may have suitably attached thereto by welding or soldering a continuous wire or strand 64 which serves to engage a semi-circular groove formed in the upper surface of the belt 58 to insure the proper alignment of the two belts as they engage and maintain such alignment through their further travel. (See Fig. 4.) If desired the strand 64 may be separated from the belt 62 and fed from supply reels to the belts and removed therefrom upon take-up reels. The belt 62 is drawn through the track 28 in engagement with the belt 58, disengages the latter belt and leaves the drum 21 at the far end thereof and at a point substantially at the bottom and returns to the bottom point of the pulley 35. Openings 75 and 76 are provided in the casing 25 for the ingress and egress respectively of the belt 62. The belts 58 and 62 are provided with cooperating semicircular grooves 65, 66, 67 and 68 which when the belts are in face to face engagement as they travel along the track 28 form continuous metallic molds for the sheathed strands 15 and 16.

By properly adjusting the action of the counterweight arrangement associated with the pulley 35 and the pneumatic cylinder arrangement shown in connection with the pulley 50, the tension on the belts 58 and 62 may be so adjusted as to insure that the sheathed strands therebetween are maintained under the proper compression during their travel along the track 28. This continuously applied mechanical compression, together with the length of the track and the temperature of the heating medium for the drum 21, insures the proper vulcanization of the sheath material surrounding the conductors.

To reduce the friction and thereby the power required to operate the mechanism, the bottom of the track 28 is provided with two run-ways 70 and 71, for the steel balls 29 which cooperate with the peculiar formation of the belt 58 to provide friction reducing means between such belt and the bottom and side walls of the track 28. In order to provide for the proper circulation of the ball bearings, a double run-way 77 interconnects the ends of the track 28, openings 80 and 81 being provided therefor in the casing 25 and being supported by a floor bracket 82. As shown perhaps more clearly in Fig. 3, the balls 29 may be carried by the action of the belt 58 to the receiving end of the run-way 77, which is preferably provided with a pair of projecting lips 85 extending to the bottom of the run-ways 70 and 71 in the track 28. The balls 29 are dropped over the lips 85 into the respective runways of the member 77 and are carried by gravity to the feeding end of such run-way, which is so formed as to insure that the balls are fed in a continuous stream into the run-ways 70 and 71 of the track just prior to the engagement therewith of the belt 58.

Although the detailed arrangement shown in Fig. 4 is the preferred form, it may be advisable in some instances to employ the arrangement shown in Fig. 5, in which individual run-ways 88 and 89 are more centrally located in the track 28. In this case a lower belt 90 will take the form shown in Fig. 5, having shoulder portions 91 and 92 serving to engage and properly register the belt 90 with an upper belt 93. In this case the proper registration of the mold grooves is insured by the shoulder portions rather than by the continuous wire or strand, as in the construction shown in Fig. 4.

A further modification of the arrangement as shown in Fig. 6 may be desirable in some instances wherein a single run-way 95 is provided along the center line of the track 28 and a lower belt 96 is provided with a similar groove for cooperation with a train of ball bearings 30 of larger size. In this case the upper belt 93 is of the same design as that shown in Fig. 5 and the registration between the two belts is effected by the shoulder portions 91 and 92 in the same way as shown in Fig. 5.

In some instances it may be unnecessary to employ a double belt arrangement, in which case the enclosure 11 is supplied with air under a constant pressure, the pressure maintained in the enclosure 11 being such as to overcome any internal stresses which may be generated within the vulcanizable material during the period of vulcanization. In such cases the arrangement shown in Fig. 7 represents the belt as it traverses the track 28 and the drum. By maintaining the air at a predetermined pressure, the same effect may be produced by means of the air or gaseous pressure exerted upon the exposed portions of the sheathed strands 15 and 16 as they lie in the grooves 65 and 67 of the belt 58 as is produced by the use of the upper belt shown in the other figures. Of course in such a case it would be unnecessary to employ the pulley 35 and the associated upper belt member, the pulley 50 and the lower belt being sufficient to care for the operation.

A floor bracket 100 supporting pulleys 101 and 102 cooperates with a floor bracket 103 supporting pulleys 104 and 105 to guide the vulcanized strand of material 15 and 16 from the traveling belts to the take-up apparatus within the enclosure 12. This take-up apparatus may consist of individual spools or reels 110 and 111 suitably mounted upon a shaft 112, which may be driven in any well known manner from a motor 113.

As the strands 15 and 16 pass through the left hand wall of the enclosure 11 into the enclosure 12, they are wiped by felt, or some other suitable material of this general nature, to retard the free escape of air from the enclosure 11 into the enclosure 12. The enclosure 12 is also provided with doors 114 and 116 to permit ready access to the enclosure for the purpose of removing filled spools or reels therefrom, and replacing them by empty spools or reels.

It will be understood that in case the double belt arrangement is employed, it is not essential that the enclosures 11 and 12 be used, since the strands are completely enveloped by continuous metal sheaths throughout the vulcanizing process.

In the operation of the device, a plurality of wires, cables, or other electrical conductors, such as 15 and 16, may be fed through the extruding machine 10 which surrounds each of the conductors with a sheathing of rubber compound, and from thence pass through chamber 14 where they are coated with powdered talc, soapstone or other similar material to overcome any tendency for the compound to readily adhere to other surfaces with which it may come in contact during the operation of the mechanism. The sheathed and coated strands 15 and 16 are then carried in engagement with individual pulleys 117 and 118 respectively, from whence they are directed into the molds formed by the grooves 65 to 68 inclusive in the belts 58 and 62. The belts 58 and 62 in engagement with each other travel around and across the periphery of the drum 21, being guided in a spiral path thereover by the track 28 formed in the exterior of the drum. The temperature of the steam introduced into the interior of the drum and the length of the track 28 are such as to insure the proper vulcanization of the sheath around the strands 15 and 16 while they travel between the two belts. The belts disengage near the distant end of the drum and the upper belt is removed from the casing around the drum at a point near the bottom thereof and carried to the bottom of its driving pulley. However, the lower belt continues in engagement with the drum to the uppermost point thereof and from thence it is carried through an opening provided therefor in the casing and to the top of its associated driving pulley. The strands 15 and 16 having a vulcanized sheathing therearound are removed from the upper belt as it emerges from the lower part of the casing and travel over pulleys 104 and 105 to the take-up apparatus within the enclosure 12. These strands are continuously wound upon the individual spools or reels 110 and 111 by the rotation of the shaft 112.

Although only two strands 15 and 16 are shown, it is evident that any desired number of strands may be employed, only two such strands having been shown in the present embodiment in order to simplify the disclosure. Also it will be noted that in case the enclosure 11 is employed and the pressure of air maintained therein at a constant value, the enclosure 12 surrounding the take-up mechanism is of particular value in assisting in the maintenance of the proper pressure within the enclosure 11, since the opening of the enclosure 12 to remove the filled spools does not permit the free egress of the air from the enclosure 11.

What is claimed is:

1. In a vulcanizing apparatus, means for vulcanizing strand material, a track, a conveyor for conveying a strand through the vulcanizing means, and an independent train of rollable elements for reducing the friction between the conveyor and the track.

2. In a vulcanizing apparatus, a heated drum having a spiral track therearound, a conveyor for conveying strand material over the track to vulcanize the material, and a plurality of rollable elements operating in the track to reduce friction.

3. In a vulcanizing apparatus, a heated drum having a spiral track thereon, a connection extending between the ends of the track, a conveyor for conveying a strand of material over the track to vulcanize the strand, and a friction reducing means circulating through the track and the connection.

4. In a vulcanizing apparatus, a heated drum having a spiral track therearound, a connection extending between the ends of the track, a conveyor for conveying a strand of material over the track to vulcanize the strand, and a plurality of rollable elements circulating through the track and the connection to reduce the friction between the conveyor and the track.

5. In a vulcanizing apparatus, a heated drum having a spiral track therearound, a conveyor for conveying strand material over the track to vulcanize the material, a plurality of rollable elements associated with the track and moving from one end to the other thereof for reducing the friction between the track and the conveyor, and means for receiving the elements discharged from one end of the track and for feeding the discharged elements into the other end of the track.

6. In a vulcanizing apparatus, a heated drum having a guiding track associated therewith, a conveyor associated with the track for conveying strand material around the drum to vulcanize the material, and a plurality of anti-friction devices co-operating with the conveyor and track to reduce friction therebetween.

7. In a vulcanizing apparatus, a heated drum having a guiding track associated therewith, a conveyor associated with the track for conveying strand material around the drum to vulcanize the material, and a plurality of anti-friction devices movable through the track to reduce friction between the conveyor and track.

8. In a vulcanizing apparatus, a heated drum having a spiral track therearound, a conveyor for conveying strand material over the track to vulcanize the material, and a plurality of anti-friction devices operating in the track to reduce friction.

9. The method of vulcanizing material in strand form, which consists in cooperatively engaging a strand of material between adjacent faces of a pair of continuous endless metal belts having smooth uniform strand engaging surfaces throughout the length thereof, feeding the engaged belts over the periphery of a stationary heated drum, thereby vulcanizing the strand, and then separating the belts and simultaneously therewith removing them from the vulcanized strand.

In witness whereof, I hereunto subscribe my name this 11th day of October A. D. 1923.

LESLIE FAWCETT LAMPLOUGH.